United States Patent [19]
Maekawa

[11] 3,727,472
[45] Apr. 17, 1973

[54] MOTOR-DRIVEN ACTUATOR

[76] Inventor: Mitugi Maekawa, 45-53 Midorgaoka-1, Choufu-shi, Tokyo, Japan

[22] Filed: June 2, 1971

[21] Appl. No.: 149,214

[30] Foreign Application Priority Data

June 22, 1970   Japan.................................45/53877

[52] U.S. Cl...................................74/89.15, 308/3 A
[51] Int. Cl............................................F16h 27/02
[58] Field of Search..........................74/89.15, 424.8; 308/3 A, 4 R, DIG. 13

[56] References Cited

UNITED STATES PATENTS

| | | | |
|---|---|---|---|
| 2,317,981 | 5/1943 | De Vlieg | 308/DIG. 13 |
| 3,030,744 | 4/1962 | Mueller | 308/3 A |
| 3,097,891 | 7/1963 | Brideau | 308/4 R |
| 3,398,484 | 8/1968 | Katsumura et al. | 74/89.15 |

FOREIGN PATENTS OR APPLICATIONS

| | | | |
|---|---|---|---|
| 212,164 | 11/1960 | Austria | 74/89.15 |

*Primary Examiner*—Charles J. Myhre
*Assistant Examiner*—Wesley S. Ratliff, Jr.
*Attorney*—Hill, Sherman, Meroni, Gross & Simpson

[57] ABSTRACT

A motor-driven actuator comprises a reversible motor, a first shaft with a male screw formed at the front portion thereof, a second shaft, and a coupling for slidably and rotatably coupling the first shaft and the rotary shaft of the reversible motor. In this case, the second shaft has female threads engaged with the male screw of the first shaft and the first shaft is rotatably supported by a bearing which is slidably supported by a support, whereby the second shaft is moved in its axial direction.

2 Claims, 4 Drawing Figures

PATENTED APR 17 1973
3,727,472
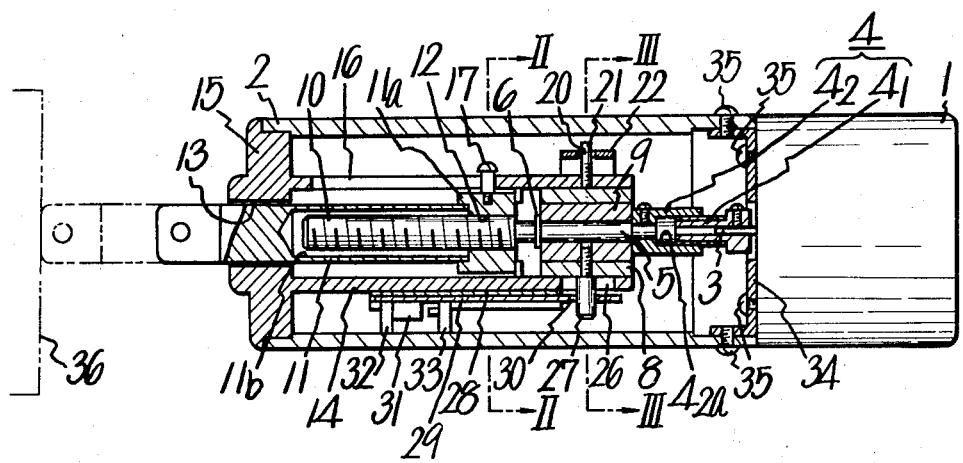
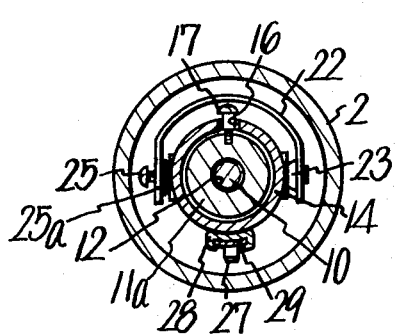 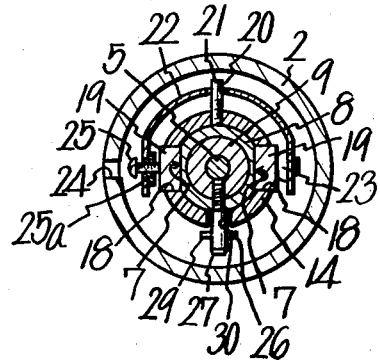
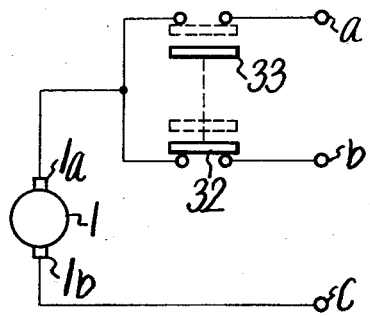
INVENTOR.
Mitugi Maekawa
ATTYS.

MOTOR-DRIVEN ACTUATOR

BACKGROUND OF THE INVENTION

1. Field of the Invention

This invention relates to a motor-driven actuator.

2. Description of the Prior Art

In the prior art, hydraulic and pneumatic actuators, solenoids and so on have heretofore been employed for power transmission or holding articles. However, the conventional hydraulic or pneumatic actuator requires an oil pump or an air compressor and piping means for supplying a fluid therethrough to the actuator. Devices having incorporated therein these actuators become inevitably bulky and expensive.

Further, the solenoid does not provide a large thrust and when it is caused to stop at a predetermined position, its thrust or output sometimes varies and in any case thrust at the tip of the rod cannot be altered at will.

SUMMARY OF THE INVENTION

One object of this invention is to provide a novel motor-driven actuator which is free from the aforementioned defects encountered in the prior art.

Another object of this invention is to provide a motor-driven actuator which is compact and inexpensive.

Still another object of this invention is to provide a motor-driven actuator in which desired thrust or output can be obtained at the tip of the rod.

Other objects, features and advantages of this invention will become apparent from the following description taken in conjunction with the accompanying drawings.

BRIEF DESCRIPTION OF THE DRAWING

FIG. 1 is a longitudinal-sectional view showing one example of a motor-driven actuator of this invention;

FIG. 2 is a cross-sectional view taken on the line II—II in FIG. 1;

FIG. 3 is a similar cross-sectional view taken on the line III—III in FIG. 1; and FIG. 4 is a circuit diagram showing the connection between a motor and a switch employed in this invention.

DESCRIPTION OF THE PREFERRED EMBODIMENT

In the drawing reference numeral 1 indicates a reversible electric motor and 2 a cylinder which is fixedly assembled with the motor 1 forwardly thereof surrounding a rotary or output shaft 3 of the motor 1. An actuating shaft 5 is coupled by a coupling 4 to the tip of the output shaft 3 projecting forwardly of the motor 1 in such a manner as to move back and forth in its axial direction in response to the rotation of the motor 1 as will be described later on.

An annular flange 6 is formed at the free end of the actuating shaft 5 and the portion of the actuating shaft 5 between the annular flange 6 and the coupling 4 is loosely inserted into an inner pipe 9 which is tightly inserted into an outer pipe 8 having parallel planar faces 7 and 7 on opposite sides thereof which are parallel to each other and to the axis of the actuating shaft 5 (refer to FIG. 3). The inner pipe 9 is rotatable relative to the shaft 5. Reference numeral 10 designates a threaded shaft coupled to the forward end (in the figure, to the left-hand end) of the actuating shaft 5 and 11 a rod. The threaded shaft 10 is threadably engaged with threads 12 of a ring 11a fixed at the rear end of the rod 11 and projects into the cavity 11b of the rod 11. The ring 11a could be dispensed with and the female threads 12 could be formed on the rear end portion of the rod 11.

The cylinder 2 is long enough to house therein the aforementioned output shaft 3, actuating shaft 5 and threaded shaft 10 and the forward end (free end) of the cylinder 2 is closed by a cover 15. The cover 15 has formed therein a bore 13 and has a sleeve or cylinder 14 formed as a unitary structure with the cover 15 on the inside thereof to surround the bore 13 and extend inwardly to the rear end of the actuating shaft 5. The forward end portion of the rod 11 threadably engages the threaded shaft 10 through the ring 11a and projects out from the bore 13 of the cover 15 forwardly thereof (to the left in the figure). The rear end portion of the sleeve 14 is loosely engaged with the periphery of the outer pipe 8 in a manner to allow the outer pipe 8 and accordingly the inner pipe 9 to slide back and forth relative to the sleeve 14.

Now, a detailed description will be given of the coupling 4. The coupling 4 consists of a first coupling element $4_1$ secured, for example, by a screw or the like to the rotary shaft 3 of the motor 1 and a second coupling element $4_4$ fixed, for example, by a screw or the like to the actuating shaft 5. The first coupling element $4_1$ is, for example, square shaped and the second coupling element $4_2$ has a hole $4_{2a}$ of a shape corresponding to that of the first coupling element $4_1$, which hole receives the first coupling element $4_1$ to transmit its rotation to the second coupling element $4_2$. Further, the first and second coupling elements $4_1$ and $4_2$ are assembled together in such a manner as to define a predetermined gap between the projecting end of the former and the bottom of the hole $4_{2a}$ of the latter and permit the latter to slide a predetermined distance in its axial direction relative to member $4_2$. The front end face of the second coupling element $4_2$ contacts the rear end face of the inner pipe 9.

The sleeve 14 of the cover 15 has formed therein a slit 16 extending in its axial direction and a pin 17 provided on the periphery of the ring 11a disposed on the rear end portion of the rod 11 fits in the slit 16, thereby to permit the rod 11 to move in the axial direction of the sleeve 14 without rotation when the motor 1 rotates as will be described later on.

Both sides of the rear end portion of the sleeve 14 corresponding to the outer pipe 8 have formed therein windows 18 and 18 of a predetermined size extending in the axial direction of the sleeve 14 (refer to FIG. 3) and pads 19 and 19 of great frictional resistance such as asbestos are fitted into the windows 18 and 18 respectively in a manner to be movable in the radial direction. The inner surfaces of the pads 19 and 19 are in contact with the plannar faces 7 and 7 of the outer pipe 8. Reference numeral 22 indicates a substantially U-shaped spring, which has a hole 20 formed substantially at the center thereof. A pin 21 projects upwardly from the rear end portion of the sleeve 14 through hole 20. A stator 23 disposed on the inside of one end of the U- shaped spring 22 is urged against one of the pads 19 due to the spring force of the spring 22. The inner end of a screw 25 threadably engages a support 25a which is fixed to the other end of the spring 22 and contacts the other pad 19. Both the pads 19 and 19 are urged against the planar faces 7 and 7 of the outer pipe 8 with suitable force, imparting to the rod 11 a force dependent upon the contact pressure of the pads 19 and 19 with the planar faces 7 and 7.

A hole 24 for adjusting the rotation of the screw 25 is bored in the cylinder 2 at a convenient position.

The underside of the sleeve 14 near its rear end has formed therein a slot 26 extending in the axial direction thereof and a pin 27 is inserted through the slot 26 into the inner pipe 9 through the outer pipe 8 in such a manner that its inner end does not reach the surface of the shaft 5, while its outer end projects beyond the sleeve 14 and is loosely inserted into an aperture 30 bored in the rear end portion of an actuating piece 29 which is fitted into a guide 28 mounted on the underside of the sleeve 14 in a manner to slide back and forth (to the right and left in FIG. 1).

Further, micro-switches 32 and 33 for controlling electrical circuits for driving the motor 1 in the forward and backward directions are provided on the inside of the cylinder 2 at places corresponding to the forward and backward operative positions of an actuator 31 projecting down from the underside of the forward end of the actuating piece 29.

Reference numeral 34 designates a metal fitting for coupling the motor 1 with the cylinder 2 by screws 35.

The motor-driven actuator of the present invention when in use is suitably fixed to a controlled device.

The operation of the motor-driven actuator is as follows: In order to drive the rod 11 to project a predetermined length from the bore 13 of the cover 15 forwardly thereof, the pin 17 mounted on the ring 11a disposed at the rear end of the rod 11 is brought to the innermost position in the slot 16 of the sleeve 14 as depicted in FIG. 1 (the switch 32 for forward drive is in the on state and the switch 33 for backward drive is in the off state by the actuator 31 at this time) and the motor 1 will be driven in the forward direction.

The connection of the motor 1 with the switches 32 and 33 under such conditions will be described in connection with FIG. 4. The switches 32 and 33 are ganged together. When the switch 32 is in the on state as above described the other switch 33 is in the off state, so that a voltage is applied between a terminal b of the switch 32 connected to one end 1a of the motor 1 and a terminal c connected to the other end 1b of the motor 1 to make, for example, the former positive relative to the latter, thus driving the motor 1 in the forward direction.

As a result, the threaded shaft 10 coupled with the output shaft 3 of the motor 1 through the coupling 4 and the actuating shaft 5 is rotated relative to the female threads 12 of the ring 11a located at the rear end portion of the rod 11 which will move the rod 11 forwardly (to the left in FIG. 1). At this time, since the pin 17 projecting from the ring 11a of the rod 11 is in engagement with the slot 16 extending in the axial direction of the sleeve 14, the rod 11 cannot rotate and projects out from the bore 13 of the cover 15 forwardly thereof without rotation.

When the rod 11 projects a predetermined length forwardly and the pin 17 reaches the forward end of the slot 16 of the sleeve 14, the rod 11 stops its forward movement. At this time, however, the motor 1 still rotates, so that the threaded shaft 10 and the actuating shaft 5 also continue to rotate. In this case, since the rod 11 cannot move forwardly as above described, the threaded shaft 10 and the actuating shaft 5 are subjected to a force to return them. These shafts 10 and 5 are mounted so that they are slidable in their axial direction as above described, and hence move back along the axial direction to the shaft 3 of the motor 1 (to the right in FIG. 1).

Further, the inner pipe 9 is loosely fitted into the actuating shaft 5 at the back of the annular flange 6 disposed forwardly of the actuating shaft 5, so that the inner pipe 9 is moved back together with the outer pipe 8 by the annular flange 6 which moves in accompany with the backward movement of the actuating shaft 5. Consequently, the pin 27 projecting downwardly from the underside of the inner pipe 9 moves the actuating piece 29 back along the guide 28 to bring the actuator 31 mounted on the underside of the actuating piece 29 at the front end thereof into engagement with the micro-switch 33 to engage it. At this time, the switch 32 is turned off as previously described, so that the motor 1 is disconnected from the power source and stopped as will be seen from the circuit shown in FIG. 4. Thus, the rod 11 rests at a predetermined projected position.

Then, the switch 32 is opened and consequently the switch 33 is closed (indicated by broken lines in FIG. 4) and a voltage is applied between the terminals a and c to make the former negative relative to the latter, thereby reversing the motor 1. When the motor 1 has reversed, the threaded shaft 10 coupled to the actuating shaft 5 rotates relative to the female threads 12 formed in the ring 11a at the rear end portion of the rod 11 in such a direction as to move the rod 11 backwardly.

When the rod 11 has entered a predetermined length into the cylinder 2 to bring the pin 17 of the rod 11 into engagement with the rear end of the slot 16 of the sleeve 14 (as shown in FIG. 1), the backward movement of the rod 11 is stopped but the motor 1 still rotates and the actuating shaft 5 moves forwards. In this case, the inner and outer pipes 9 and 8 move forward together with the actuating shaft 5, since the pipes 8 and 9 are coupled with the coupling 4.

With the forward movement of the inner and outer pipes 9 and 8, the actuating piece 29 coupled therewith through the pin 27 is moved forward which causes the actuator 31 on the underside of the forward end portion of the actuating piece 29 to engage the micro-switch 32, and the switch 33 is opened. As a result of this, the voltage supply to the motor 1 is cut off to stop it.

During the forward projecting movement of the rod 11, if the rod 11 comes across an obstacle 36 lying ahead of the pin 17 projecting from the ring 11a before the rear end portion of the rod 11 reaches the forward end of the slot 16 of the sleeve 14, the rod 11 is prevented by the obstacle 36 from further forward movement and is thereby stopped. At this time, the actuator 31 closes the switch 33 due to the aforementioned backward movement of the actuating shaft 5 to stop the motor 1. In this case, the force imparted by the rod 11 to the obstacle 36 is a constant force which is dependent upon frictional force between the both planar faces 7 and 7 of the outer pipe 8 and the pads 19 and 19 pressed by the spring 22.

Accordingly, articles can be held for a certain period of time by, for example, providing a plurality of sets of one or more motor-driven actuators above described are mounted radially about the articles and the present invention is usable in the field of industrial robots with great utility.

Further, the force of the rod 11 can be adjusted, as desired, by turning the threaded shaft 25 of the U-shaped spring 22 with a screw driver or the like inserted in the hole 24 of the cylinder 2 to thereby adjust the force of the spring 22 on to the pads 19 and 19. Therefore, the motor-driven actuator of the present invention can be widely used. The pin 21 can be dispensed with, if desired and the spring 22 will stay in position.

The foregoing is intended as being illustrative of one example of this invention. For example, the cylinder 2 need not be limited specifically to the illustrated one but may be formed in rod-like configuration, so long as it supports the sleeve 14. Further, the sleeve 14 also need not be limited specifically to a cylindrical one but may be of such a construction which holds the outer pipe 8 in a manner to permit its sliding movement and holds the rod 11 in a manner to prevent its rotation but permit its sliding movement in the axial direction. In addition, the rod 11 also need not be restricted to the illustrated one but may be a plurality of rods which can be pushed out and pulled in through the cover 15 and have the ring 11a at one end and a coupling element at the other end.

With the present invention the rod projecting out from the forward end of the cylinder can be stopped accurately at a desired position and it is also possible to adjust at will the force of the rod striking against an object when the rod stops. Therefore, the present invention is of great utility in practical use.

It will be apparent that many modifications and variations may be effected without departing from the scope of the novel concepts of this invention.

I claim as my invention

1. A motor-driven actuator in which a first shaft means having a male screw formed at one portion thereof is coupled with a rotary shaft of a reversible motor through a coupling means and a second shaft means having female threads engageable with the male screw of the first shaft means coupled to the first shaft means, the improvement comprising:

a means for slidable supporting the second shaft means;

a bearing means for rotatably supporting the non-threaded portion of the first shaft means, the bearing means being supported by the supporting means, slidable with the first shaft means and frictionally engageable with the supporting means;

an actuating means actuated by the bearing means to control the rotation of the reversible motor; and a means for adjusting the frictional force between the bearing means and the supporting means whereby a desired force determined by the frictional force between the bearing means and the supporting means is obtained with the second shaft means.

2. A motor-driven actuator as claimed in claim 1 wherein the frictional force adjusting means includes a substantially U-shaped spring, a pad and a screw respectively provided at both ends of the spring, the pad and the screw of the both ends of the U-shaped spring engaging pads provided on the supporting means, the frictional force between the supporting means and the bearing means being adjusted by turning the screw.

* * * * *